(12) United States Patent
Landscheidt et al.

(10) Patent No.: US 9,787,540 B2
(45) Date of Patent: Oct. 10, 2017

(54) SYSTEM AND METHOD FOR PREDICTIVE NETWORK CONGESTION CONTROL

(75) Inventors: Dennis Landscheidt, Mannheim (DE); Marc-Oliver Klein, Mannheim (DE)

(73) Assignee: SAP SE, Walldorf (DE)

(*) Notice: Subject to any disclaimer, the term of this patent is extended or adjusted under 35 U.S.C. 154(b) by 348 days.

(21) Appl. No.: 13/608,536

(22) Filed: Sep. 10, 2012

(65) Prior Publication Data

US 2014/0071814 A1    Mar. 13, 2014

(51) Int. Cl.
H04L 12/24 (2006.01)
H04L 29/08 (2006.01)
H04L 12/911 (2013.01)
H04L 12/923 (2013.01)

(52) U.S. Cl.
CPC ...... H04L 41/0816 (2013.01); H04L 41/0681 (2013.01); H04L 41/147 (2013.01); H04L 47/823 (2013.01); H04L 67/306 (2013.01); H04L 47/743 (2013.01); H04L 47/745 (2013.01); H04L 47/748 (2013.01); H04L 47/762 (2013.01); H04L 47/822 (2013.01)

(58) Field of Classification Search
CPC ... H04L 41/5003; H04L 47/24; H04L 47/823; H04L 41/5029; H04L 67/306
See application file for complete search history.

(56) References Cited

U.S. PATENT DOCUMENTS 8,392,574 B1*  3/2013  Shah et al. .................... 709/226
9,659,310 B1*  5/2017  Allen ................. G06Q 30/0259
2005/0091303 A1*  4/2005  Suzuki ........................... 709/200
2006/0120282 A1*  6/2006  Carlson et al. ............... 370/229
2008/0108345 A1*  5/2008  Calin et al. ................... 455/424
2010/0157841 A1*  6/2010  Puthenpura et al. ......... 370/253
2010/0273493 A1  10/2010  Matsunaga et al.
(Continued)

FOREIGN PATENT DOCUMENTS

EP    0883075 A2    12/1998
EP    2469757 A1     6/2012
(Continued)

OTHER PUBLICATIONS

"European Application Serial No. 13183688.4, Search Report dated Dec. 18, 2013", 5 pgs.
(Continued)

*Primary Examiner* — Gregory Sefcheck
*Assistant Examiner* — Jenkey Van
(74) *Attorney, Agent, or Firm* — Schwegman Lundberg & Woessner, P.A.

(57) ABSTRACT

A method for predictive network congestion control may include receiving network traffic data of a network. The network traffic data may be indicative of a current level of use or the network. A predicted future level of use at the location of the network may be identified based on the received network traffic data and based on past network traffic data for the location of the network. A recommendation to alter the future level of use for the location may be generated. The recommendation may include a type of alert to transmit to devices of users in the location of the network. The recommendation may be transmitted to a network policy management server of the network.

20 Claims, 7 Drawing Sheets

(56) References Cited

U.S. PATENT DOCUMENTS

| | | | |
|---|---|---|---|
| 2012/0101886 A1* | 4/2012 | Subramanian | G06Q 30/0611 |
| | | | 705/14.23 |
| 2012/0202405 A1* | 8/2012 | Saunders | B24B 19/14 |
| | | | 451/54 |
| 2012/0329424 A1* | 12/2012 | Gudlavenkatasiva | H04L 12/1421 |
| | | | 455/406 |
| 2013/0051331 A1* | 2/2013 | Bao et al. | 370/329 |
| 2013/0060641 A1* | 3/2013 | Al Gharaballly | G06Q 30/02 |
| | | | 705/14.66 |
| 2013/0124557 A1* | 5/2013 | Goode | G06F 17/30029 |
| | | | 707/769 |

FOREIGN PATENT DOCUMENTS

| | | |
|---|---|---|
| JP | 11032085 A | 2/1999 |
| JP | 2011176428 A | 9/2011 |

OTHER PUBLICATIONS

"Japanese Application Serial No. 2013-186000, Office Action dated Oct. 1, 2015", 6 pgs.

Yagi, Noriyuki, et al., "Pricing Control for Scheduling in Contents Delivery Networks (with English abstract)", Institute of Electronics, Information and Communication Engineers, (2002), 21-24.

Yasuda, Takeshi, et al., "Qos Control Method Between Multi Locations in Wide Area Ethernet (with English abstract)", vol. 105, No. 512. IECI Technical Report, (2006), 8 pgs.

\* cited by examiner

SYSTEM AND METHOD FOR PREDICTIVE NETWORK CONGESTION CONTROL

TECHNICAL FIELD

This patent document pertains generally to network management, and more particularly, but not by way of limitation, to a system and method for predictive network congestion control.

BACKGROUND

For communication service providers (CSP), such as those providing mobile communication networks, the increase in demand for network resources has created many problems. For example, the increase in demand has led to network congestion that may not be fixed quickly or cheaply by adding more access points (e.g., cellular towers). This congestion may lead to dropped calls, lower bitrates, and overall lower customer satisfaction.

BRIEF DESCRIPTION OF DRAWINGS

Some embodiments are illustrated by way of example and not limitation in the figures of the accompanying drawings in which.

DETAILED DESCRIPTION

Figure 1:
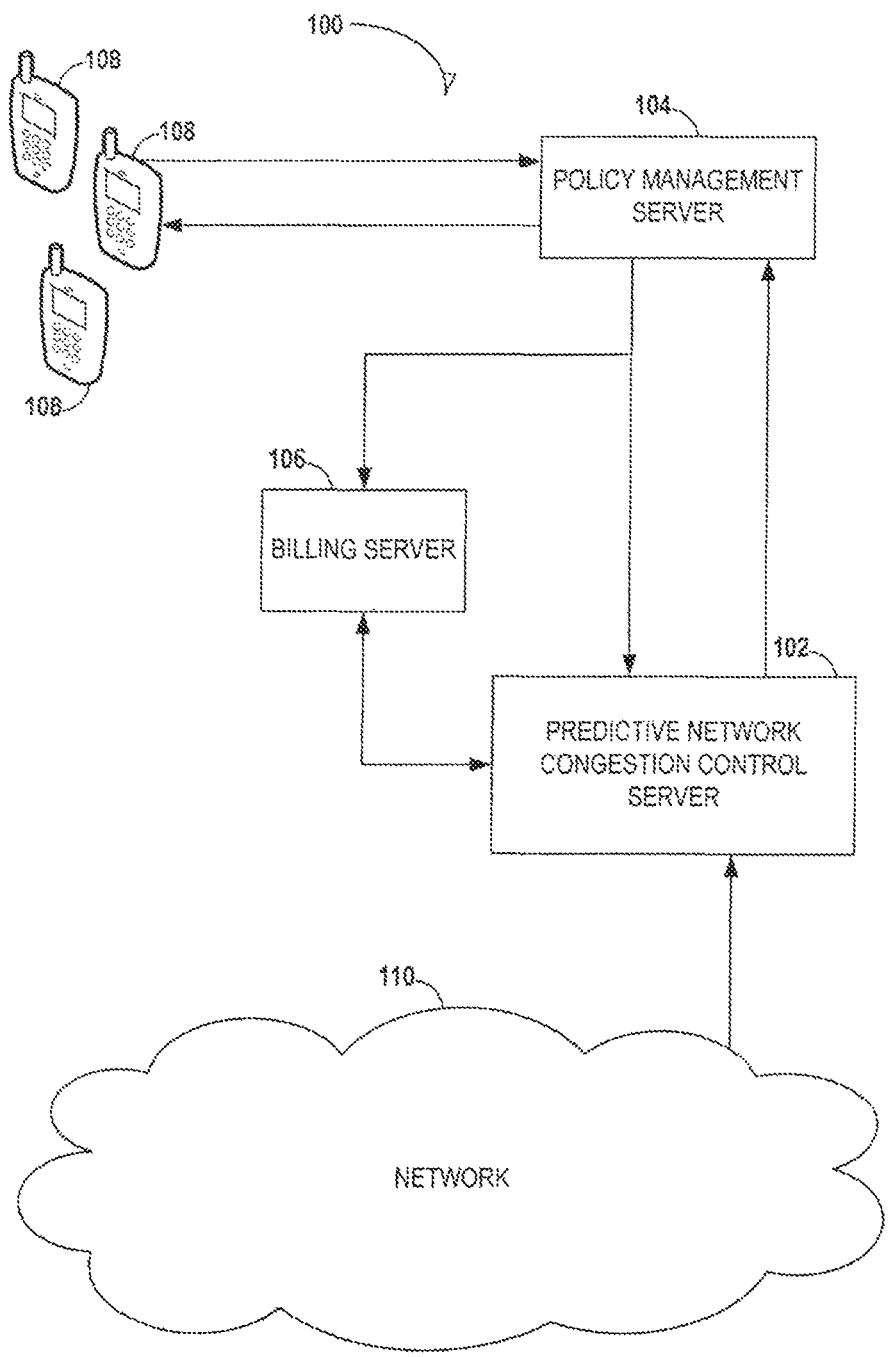
FIG. 1 is a system overview diagram, according to an example embodiment.

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

For communication service providers (CSPs), such as those providing mobile communication networks, the increase in demand for network resources has created many problems. For example, the increase in demand has led to network congestion that may not be fixed quickly or cheaply by adding more access points (e.g., cellular towers). This congestion may lead to dropped calls, lower bitrates, and overall lower customer satisfaction.

CSPs have tried various policy management strategies to combat the congestion in a number of ways. Policy management may have two technically focused areas—quality of service (QoS) and network performance. Additionally, CSPs have begun to end unlimited use data plans.

In an embodiment, QoS adjustments involve the definition service-dependent performance requirements to guarantee network quality. For example, a CSP might give voice services higher priority than peer-to-peer services. This may help to increase customer satisfaction and avoid churn.

In an embodiment, network performance adjustments may be focused on avoiding network congestion. Here, the CSP may curtail the bandwidth of users with excessive data usage and limits traffic rates. For example, a CSP may delay certain packets or even allow an acceptable rate of packet loss for specified services such as video.

In various embodiments, a third approach is taken to alleviate network congestion. Briefly stated, this third approach gives the CSP the ability to send alerts to users based on current or future levels of use (e.g., congestion) in an area of a network. These alerts may include an offer to decrease the users current QoS in exchange for adding credit to the users account. In various embodiments, credit may refer to a monetary credit or non-monetary credit such as award points. For example, an alert may include an offer to increase the QoS for video in exchange for a reduction in the credit balance of the user's account. For convenience, and not by way of limitation, this third approach will be referred to herein as predictive network congestion control (PNCC).

By using the PNCC system, additional benefits may be realized. For example, the PNCC system may record how users respond to the alerts. This in turn may allow a CSP to better tailor pricing structures to simultaneously reduce network congestion and maintain customer satisfaction. In various embodiments, the PNCC system also incorporates a machine learning element that learns what alerts have an impact in which do not. Thus, the PNCC system may adapt to the current environment.

FIG. 1 diagrams an example PNCC system 100. PNCC system 100 may include PNCC server 102, policy management server 104, billing server 106, user equipment (UE) 108, and network 110.

While system 100 is illustrated with servers 102, 104, and 106, the servers may be implemented as one server. Similarly, each server may include one or more additional computers to perform the server's respective tasks. The servers may be located in a single location or may be distributed across multiple locations.

In various embodiments, the elements shown in system 100 are connected via one or more networks. For example, network 110 may be a cellular-based network managed by a CSP. Servers 102, 104, and 106 may communicate via network 110 or additional networks not shown. Example networks may include local-area networks (LAN), wide-area networks (WAN), wireless networks (e.g., 802.11 or cellular networks such as UMTS and LTE), the Public Switched Telephone Network (PSTN) network, ad hoc networks, personal area networks (e.g., Bluetooth) or other combinations or permutations of network protocols and network types. The networks may include a single LAN or WAN, or combinations of LANs or WANs, such as the Internet.

In an embodiment, policy management server 104 manages the traffic flow of network 110. Managing may include defining QoS metrics and attempting to lower network congestion. For example, a QoS policy may be to give priority to voice traffic over video traffic that is destined for UE 108. Reducing network congestion may include limiting or blocking traffic to high bandwidth users. Policy management server 104 may have different policies for different geographic areas.

In an embodiment, billing server 106 is a server that manages the accounts of users of network 110 and is related to billing, rating, and charging functionality. For example, billing server 106 may have a database that stores entries for users of network 110. In an embodiment, each entry stores an identifier (e.g., name, phone number, social security number, account number) that is associated with UE 108. Each entry may include one or more billing rates associated with the use of network 110 for the user. For example, there may be a flat monthly rate for voice usage and a per-gigabyte rate for data usage. These billing rates may change based on whether or not a user has accepted an offer for a temporary decrease/increase in quality of service as will be discussed further herein. Billing server 106 may also store account balances of the user that are deduced or credited based on user choices.

Figure 3:
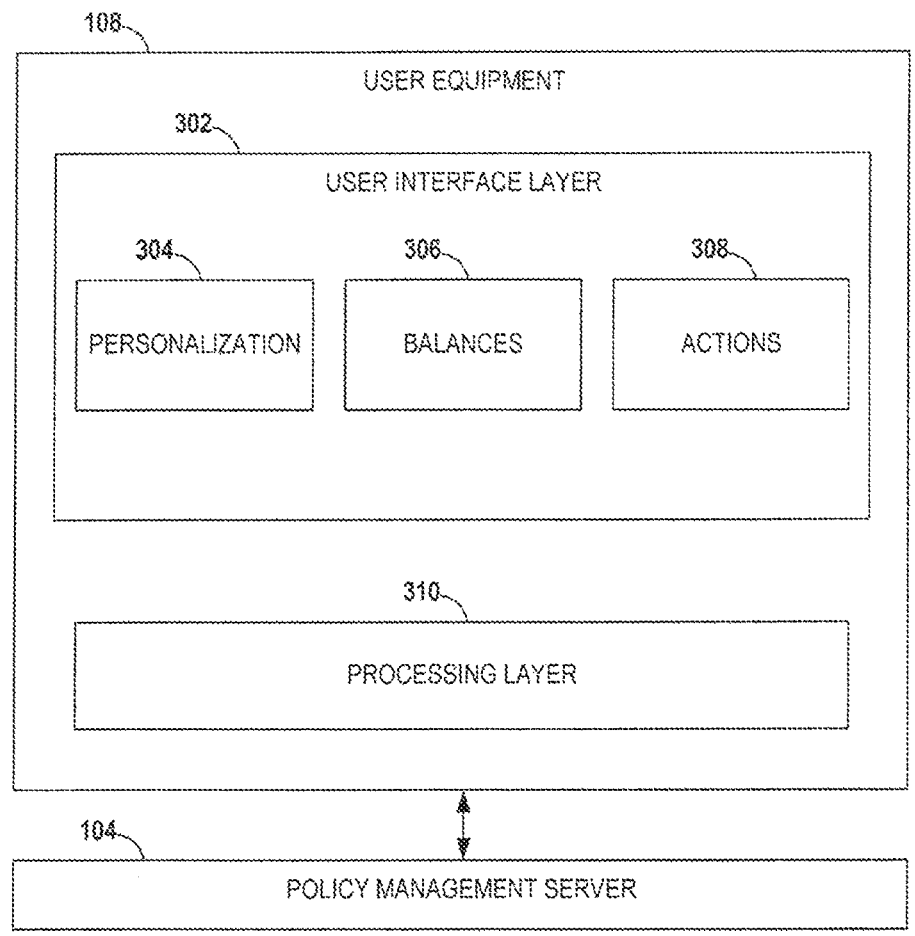
FIG. 3 is a diagrammatic representation of user equipment (UE), according to an example embodiment.

User equipment 108 may utilize network 110 for data and/or voice communications. Examples of user equipment may include, but are not limited to laptops, tablets, cell phones, smart phones, feature phones, personal computers (PCs), network access cards, and other devices capable of communicating on a network. For narrative purposes and not by way of limitation, user equipment 108 will be considered a cellular phone capable of responding to messages sent by policy management server 104. FIG. 3 illustrates an example UE 108 in more detail.

Figure 2:
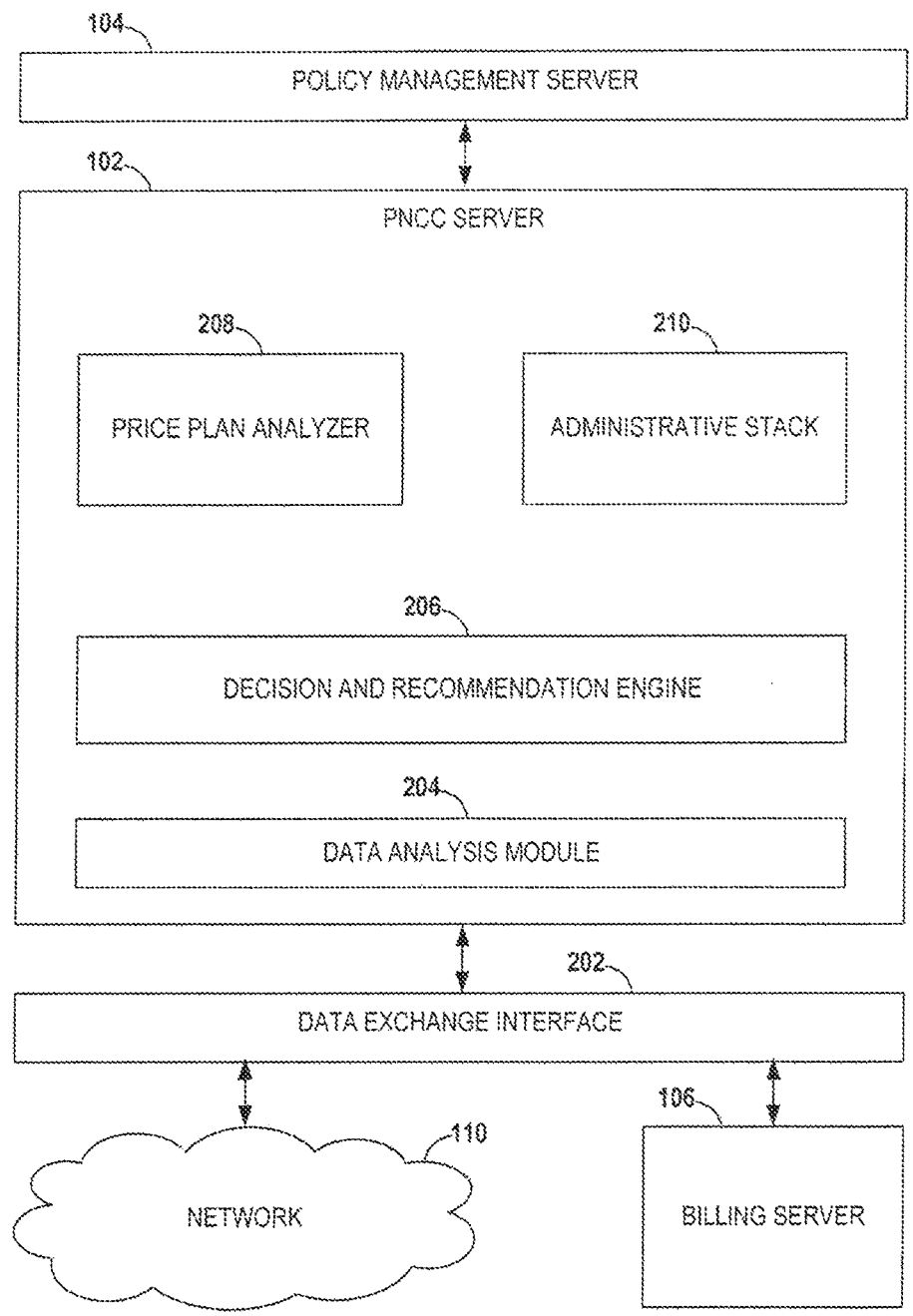
FIG. 2 is a diagrammatic representation of a predictive network congestion control (PNCC) server, according to an example embodiment.

In an embodiment, PNCC server 102 analyzes traffic data of network 110 and provides a recommended next course of action to policy management server 104. For example, the next course of action may include an alert to send to a user that will affect QoS or network congestion on network 110. FIG. 2 illustrates a more detailed example of PNCC server 102.

FIG. 2 illustrates PNCC server 102, policy management server 104, billing server 106, network 110, and data exchange interface 202. In an embodiment, PNCC server 102 includes price plan analyzer 208, administrative stack 210, decision and recommendation engine 206, and data analysis module 204.

In an embodiment, data exchange interface 202 is configured as one or more interfaces for exchanging data. For example, data exchange interface may be implemented as one or more Application Programming Interfaces (API). Thus, for example, data from billing server 106 may be in a first format and reformatted for use by PNCC server 102. Data exchange interface 202 may also include one or more function calls for the retrieval or submission of data. For example, an API call may be defined for transmitting billing account data from billing server 106 to PNCC server 102 through data exchange interface 202. While illustrated as separate from PNCC server 102, data exchange interface 202 may be part of PNCC server 102. While not illustrated, data exchange interface 202 may also be used to exchange data between policy management server 104 and PNCC server 102.

In an embodiment, network traffic data about a CSP's network may be received at PNCC server 102 via data exchange interface 202. In various embodiments, the network traffic data is generated in data analysis module 204 by an analysis of network 110. In various embodiments, the network traffic data is received according to the internet protocol detail record (IPDR) interface. An IPDR may be formatted according to standard generalized markup language such as XML.

The network traffic data may include the current number of packets in transit in network 110, communication channel information, number of virtual channels, network throughput rate, channel window size, buffer utilization, capacity, registered devices (e.g., per network, per cell, per region), consumption detail records (CDRs), QoS requirements, types (e.g., voice, video) of data being used, and queue lengths (e.g., minimum and maximum threshold of packages). The network traffic data may be received periodically (e.g., every five seconds, minute, hour, etc.) for one or more CSPs. In various embodiments, different types of network traffic data are received at different period intervals. For example, QoS requirements may be received every day while the current number of packets is received every ten minutes.

In various embodiments, data analysis module 204 generates and maintains a traffic database of the received network traffic data. The traffic database may be stored in volatile memory such as system memory. Thus, any lookup and storage may be considerably faster than non-volatile memory such as traditional optical disk storage. In an embodiment, the database is stored as a relational or flat-file database; however, any format capable of the storage and retrieval of data may be used.

In an embodiment, within the traffic database, the network traffic data is correlated with the time (e.g., date, hour, minute, second) with which the network traffic data is associated (e.g., the time that network traffic was collected). The traffic data may further be correlated with a specific location. In an embodiment, location may be defined in a number of different ways. For example, a location may be an individual cell tower, an arbitrary area defined by geo-coordinates, a zip code, or city. In various embodiments, each piece of traffic data is correlated with one or more locations.

In an embodiment, correlation between two pieces of information means that retrieval of one of the pieces of information leads, directly or indirectly, to the other piece of information. For example, a traffic database may have a plurality of data entry rows that include columns for each type of traffic data, time, and location. Thus, a query of the database for a location will result in a plurality of rows that include the number of packets in the network at a variety of times. Other arrangements of data correlation may also be used (e.g., a database schema with common key identifiers) without departing from the scope of this disclosure.

In an embodiment, decision and recommendation engine 206 uses the data in the traffic data to predict future levels of use of network 110 in one or more locations and transmit a next best course of action to policy management server 104. Levels of use may also be referred to as a congestion level. Determining a current, or predicting a future, congestion level may be based on a statistical model defined according to a CSP (referred to herein as the congestion model). For example, a relatively simply congestion model for determining a congestion level at any point in time may be:

Registered Devices/Capacity

A more complex congestion model be involve scaling and weighting multiple types network traffic data such as:

0.2(Registered Devices)+0.5(Packets in Transit)+0.3 (buffer)

In other embodiments, the congestion model may use a single piece of the traffic data. The numerical output of the congestion model may then be compared to a predefined set or ranges for a variety of congestion levels (e.g., low, medium, high). The output of the congestion model and determined congestion level may be associated with the received network traffic data (e.g., the row for the traffic data may be updated). While predicting a congestion level is discussed herein, similar models may be utilized that output a predicted buffer level.

In various embodiments, predicting a future congestion level may be based on another model (referred to herein as the prediction model) defined by the CSP. A simple model may be to look at historical congestion levels for a given location and predict that a similar period in the future will have the same congestion level. For example, at 6:00 PM on Tuesdays, the average congestion level (e.g., as computed using the congestion model) may be low according to historical trends. Then, at 7:00 PM, the average congestion level may increase to high. Thus, decision and recommendation engine 206 may transmit a recommended course of action to a CSP to offer incentives to users to use less bandwidth or network 110 at 7:00 PM on Tuesdays. Specific incentives will be discussed further herein.

In an embodiment, more complex prediction models may also be used to predict future congestion levels. For example, using various statistical techniques such as regression analysis, the network traffic data may be analyzed to determine which types of data are more predictive of, or correlated with, future congestion levels. Thus, when the determined types of data change, a prediction (e.g., a percentage probability or nominal change in congestion) of future congestion may be made. "Future" may refer to any period of time such as in the next five minutes or next hour. In various embodiments, multiple predictions for different periods may be generated.

In various embodiments, the prediction model is dynamically adjusted as new traffic data becomes available. For example, consider a congestion prediction made at 8:00 PM on the next Friday. Decision and recommendation engine 206 may generate the congestion level at 8:00 PM or that next Friday and compared it to the predicted level. If the two congestion levels are different, an adjustment may be made to the prediction model to reflect the actual congestion level. Additionally, models may be generated in a similar fashion that identify a current buffer usage and a predicted future buffer usage.

As discussed briefly above, decision and recommendation engine 206 may output a next best course of action and transmit it to policy management server 104. In various embodiments, a next best course or action may be at least one of two different types: (1) network policy recommendations; and (2) incentive recommendations. The next best course of action may be based on a CSP's defined requirements for a network. For example, a CSP may indicate that congestion levels should not be above medium in the hours of 8 AM until 4 PM on the weekdays. Those requirements may be stored within PNCC server 102.

A network policy recommendation may include data identifying which types of packets should be prioritized over other packet types. For example, the recommendation may indicate that voice packets should be given priority over video packets for the next two hours. Other types of recommendations may include limiting available bitrates and increasing latency. However, as broad-based network changes may cause subscribers to have worries about network service/reliability, an incentive recommendation may also be transmitted to policy management server 104.

In various embodiments, an incentive recommendation identifies an offer, also referred to as an alert, to send to one or more subscribers in a location of network 110. The offer may include at least three components: (1) quality change; (2) cost; and (3) duration.

In an embodiment, the quality change indicates what network setting for the subscriber will change if the offer is accepted. For example, the quality change may be an increase or decrease in the bandwidth available for a type of data packet (e.g., video, Voice over IP (VoIP)). In an embodiment the quality change is a global change such that the increase/decrease in bandwidth is packet type agnostic.

In various embodiments, the cost may be monetary or non-monetary (e.g., points, credits). For example, each subscriber may have an account balance of monetary and/or non-monetary amounts. The offer may indicate that the quality change costs $2.00 or 15 points. Similarly, an offer may indicate the quality change may result in an increase of $2.00 or 15 points to a user's account balance.

In an embodiment, the duration may be numerical or conditional. For example, the quality change may last for two hours or until the congestion level drops to a certain level. The duration may be a repeating period such that the user is charged/credited once per defined period until the condition is met.

Thus, in various embodiments, decision and recommendation engine 206 may transmit one or more incentive recommendations to policy management server 104. The recommendation may be targeted to specific locations such as individual cell towers.

Additionally, the incentive recommendation may include the number of subscribers the offer should be sent to. For example, based on past acceptance rates of similar offers, decision and recommendation engine 206 may determine that the offer has a predicted 25% acceptance rate. Additionally, based on the prediction and congestion models, decision and recommendation engine 206 may have determined that for every 100 subscribers that accept the offer, congestion levels decrease 2%. Thus, if the CSP's requirements indicate a need for a 4% drop in congestion, the recommended course action will be to send the offer to 800 subscribers (800*0.25=200 acceptance and 4% reduction in congestion). The determination of the predicated acceptance rate may be based on information received from policy management server 104. As with the other models, the predicted acceptance rate may be judged against the actual acceptance rate and updated to reflect any discrepancy.

In various embodiments, price plan analyzer component 208 analyzes and recommends price plans based on the past usage and congestion patterns as determined in decision and recommendation engine 206. For example, price plan analyzer component 208 may analyze billing data received from billing server 106. The billing data may include the current pricing plans for subscribers in one or more locations. The pricing plans may be for unlimited data/voice usage, tiered plans, and data type specific pricing plans. Over time, as with network traffic data, decision and recommendation engine 206 may determine what effect (e.g., using regression analysis) an increase or decrease in pricing has on network congestion. Thus, based on a CSP's requirements, price plan analyzer component 208 may recommend a pricing plan for one or more subscribers.

In various embodiments, PNCC server 102 may provide an interface (e.g., web service API, stand-alone application, web page) that is configured to receive input from a user (e.g., manager/administrator of a CSP). The input may be related to a structure of a pricing plan. Price plan analyzer component 208 may output the effects the input will have on network 110. For example, the output may show the change in congestion levels. The output may also show the price sensitivity of subscribers (e.g., at what price does a subscriber reduce his or her network usage or at what price does a subscriber switch carriers). Thus, the user can simulate the impact of different pricing structures before implementation.

In various embodiments, administrative stack component 210 is configured to facilitate the exchange of data between the various components of PNCC server 102. For example, administrative stack component 210 may help define the data models (e.g., predictive and congestion) that are used by decision and recommendation engine 206 in recommending the next best course of action. "Defining" may mean storing a representation of the model in a database and associating it with a CSP. Administrative stack component 210 may also be responsible for defining how the data received via data exchange interface 202 is stored (e.g., a schema). Similarly, administrative stack component 210 may define any APIs that may be used for the exchange of data via data exchange interface 202.

FIG. 3 illustrates an example UE 108. In an embodiment, the UE 108 is a smart phone including at least one processor, RF receiver, RF transmitter, power source, display, input device, speaker, storage device, and microphone. The processor may control the overall functions of UE 108 such as running applications stored on the storage device and controlling peripherals. The processor may be any type of processor including RISC, CISC, VLIW, MISC, OISC, and the like. The processor may communicate with the RF receiver and RF transmitter to transmit and receive wireless signals such as Bluetooth, and WiFi signals. The processor may use short term memory to store operating instructions and help in the execution of operating instructions and applications such as the temporary storage of calculations and the like. The processor may also use non-transitory storage to read instructions, files, and other data that requires long term, non-volatile storage. The processor may receive input from the input device (e.g., gesture capture, keyboard, touch screen, voice). The processor may produce audio output and other alerts which are played on the speaker.

In various embodiments, UE 108 is configured to run one or more applications that communicate with policy management server 104 or billing server 106. UE 108 may also communicate with a loyalty management platform, not illustrated, if the subscriber is using non-monetary currency. For example, UE 108 may include personalization application 304, balances application 306, and actions application 308 within user interlace layer 302. The applications may exist in a single application that is download from a CSP server or from an online application store provided by the manufacturer of UE 108. The application(s) may be updated periodically. Further illustrated is processing layer 310 that may be configured to receive and transmit data from UE 108 regarding incentive alerts.

In various embodiments, personalization application 304 is configured to display one or more user interfaces (UIs) to a user (e.g., a subscriber to a CSP using UE 108) to generate rules regarding which alerts from a CSP to accept or decline. For example, a rule may be created that automatically accepts a 1 Megabit/second (Mbit/s) reduction in video bandwidth for three hours in exchange for a $1.00 dollar or 10 point credit.

To this end, a UI screen may be presented with one or more of the three components of an alert as discussed above: (1) quality change; (2) cost; and (3) duration. Each component may have one or more dropdown menus, of other UI input element, tailored to the component. For example, the quality change component may have a dropdown menu with entries for types of bandwidth (e.g., generic data, video data, audio data) and the rate of quality change (e.g., 1 Mbit/s decrease, 1 Mbit/s increase). The cost component may have a dropdown with monetary or non-monetary values to effect the quality change (e.g., credit of $2.00, debit of $2.00, credit of 10 loyalty points). The duration may have a dropdown menu with a list of values (e.g., 1, 2, 3) and a dropdown menu for period (e.g., minute, hour, day). Other components may also be used in the creation of a rule, such as time of day and available credit.

Additionally, Boolean (e.g., AND, OR, NOT) and relational operators (e.g., <, >, <=, etc.) may be presented to the user such that a rule may be created with multiple conditions. Finally, a dropdown menu may be provided with an action to take if the rule is evaluated and is true. In an embodiment, the actions may be automatically accept the offer; automatically deny the offer; and present the offer for my approval/denial. For example, to construct the example rule above, a user may select the video bandwidth from the types of bandwidth dropdown, the 1 Mbit/s decrease from the rate of quality change dropdown, an AND operator connected to a selection of a $1.00 credit, an AND operator connected to a selection of a '3' and 'hour' from the duration dropdowns, and an automatically accept from the action dropdown. In various embodiments, the rules are stored on the UE 108 for later evaluation when an offer is received. Personalization application 304 may allow a user to retrieve a previously generated rule and make edits, which are then stored.

In an embodiment, balances application 306 is configured to retrieve and display the credit balance(s) of the user's account(s) that have been linked for use with the CSP. For example, the user may have a checking account and an airlines reward account. Login, identification, or authorization credentials (e.g., token, key) may be stored on UE 108 for the retrieval of the balances. Balances application 306 may periodically (e.g., daily) or conditionally (e.g., after an offer is received or accepted) retrieve the account's balance. For example, balances application 306 may send a balance request using the authorization credentials to billing server 106 (or a loyalty platform server). Billing server 106 may send the balance back to UE 108, which forwards the message to balances application 306. Balances application 306 may then store the balance with a timestamp of when the balance was received.

In an embodiment, a user may open (e.g., activate the application using an input device or UE 108) balances application 306 and be presented with the balances of the user's accounts and the timestamps of the retrieval of the balances. The user may be presented with an option to manually refresh the balances outside of any scheduled update. Additionally, the user may be presented with options to add or remove accounts. A preference for selecting default account may also be displayed. In an embodiment, action application 308 will use the default account when determining which account to credit or debit based on the acceptance of an offer.

In an embodiment, action application 308 evaluates offers that are received at UE 108 from policy management server 104. For example, when an offer is received at UE 108, action application 308 may parse the offer to determine the values of its components (e.g., the duration, cost, etc.). Action application 308 then may evaluate each rule using these values, and any other rule condition, that has been stored by the user to determine an action to take. If more than one rule evaluates to true and the actions conflict (e.g., one action is to automatically accept and the other is to automatically decline), a message may be displayed on the screen of UE 108 with options to accept or deny the offer. Based on a rule or manual selection by the user, a decision is made of whether to accept or deny the offer. The decision may be communicated from action application 308 to processing layer 310.

In an embodiment, processing layer 310 is configured to publish decisions determined by action application 308 to policy management server 104. In an embodiment, publishing includes transmitting the decision and the terms of the offer back to policy management server 104. In an embodiment, when an offer is received from policy management server 104, an identification (numerical, alphanumerical) is included with the offer. When responding to the offer with the decision, processing layer 310 may include the identification.

While described above with a UE-centric rule management paradigm, others arrangements may be used. For example, the rules for accepting or denying may be established using a web server run by the CSP. Then, an offer may be accepted without the offer ever being transmitted to the UE as the rules may be evaluated on the web server. A notification may then be transmitted to the UE when an offer has been accepted that identifies the terms of the offer. An option may be presented to the user to override the acceptance.

Figure 4:
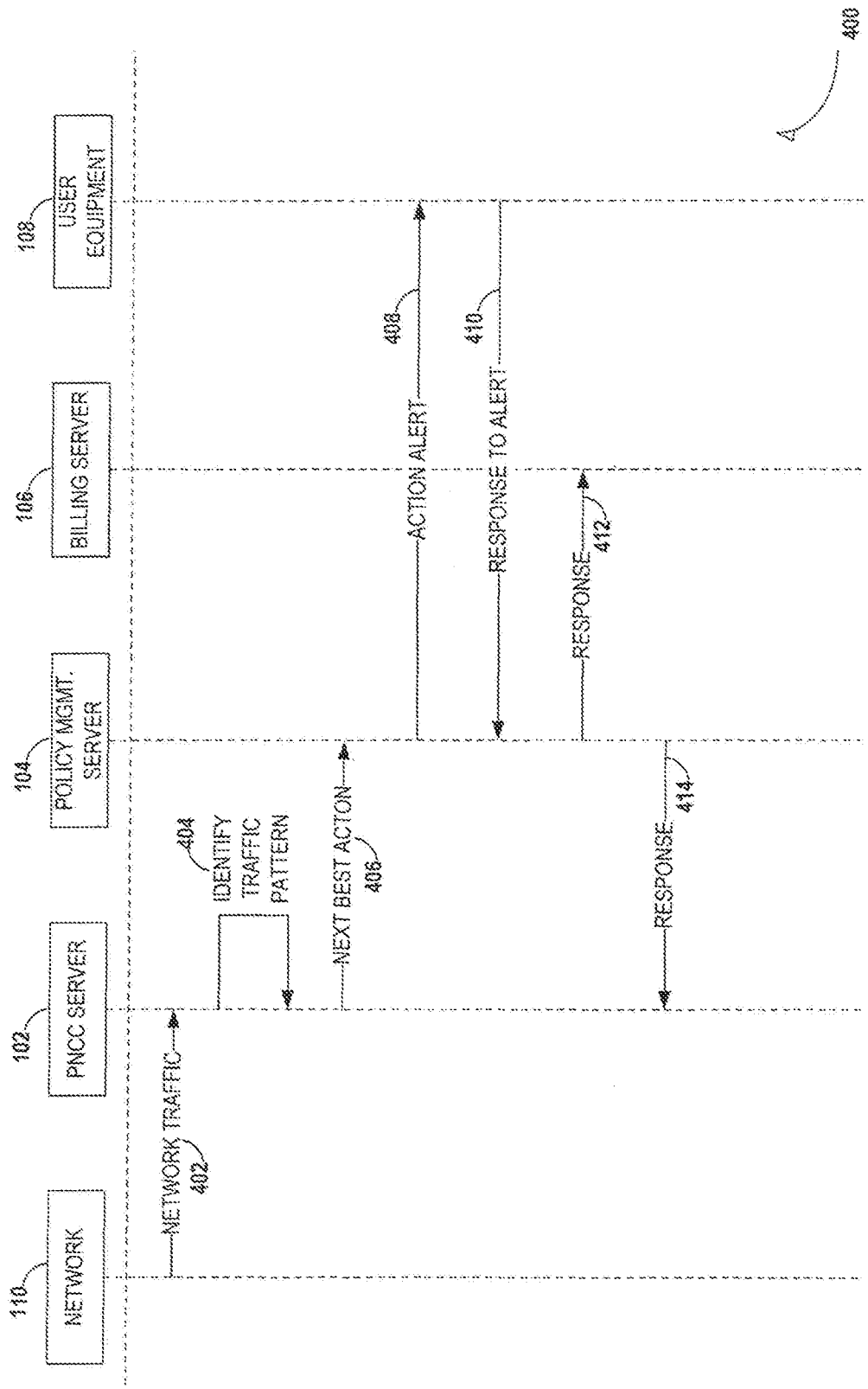
FIG. 4 is a data flow diagram, according to an example embodiment.

FIG. 4 illustrates an example data flow diagram 400, according to an example embodiment. Illustrated within data flow diagram 400 is network 110, PNCC server 102, policy management server 104, billing server 106, and UE 108.

In an embodiment, network traffic data 402 from network 110 is received at PNCC server 102. As discussed, network traffic data 402 may comprise many types of data characterizing the flow of data through network 110. At PNCC server 102, traffic patterns 404 are identified. The traffic patterns may be current or future congestion levels of network 110.

In an embodiment, based on the identified traffic pattern 404, next best action data 406 is generated and transmitted to policy management server 104. For example, the identified traffic pattern may be a predicted future level of use for a location in the network. If the predicted level of use is above a requirement of a CSP, the next best action may be an instruction transmitted to policy management server 104 to offer a certain number of subscribers in the location a credit of $2.00 in exchange for a drop in available bitrate.

In an embodiment, policy management server 104 receives the next best action data 406 and transmits an action alert 408 to UE 108. In various embodiments, action alert 408 is transmitted using short message services (SMS), multimedia messaging services (MMS), Unstructured Supplementary Service Data (USSD), or push notification. The action alert 408 may include the offer details received in next best action data 406. In an embodiment, UE 108 transmits the response to alert 410 back to policy management server 104. The response may be determined according to automated rules stored in UE 108.

In an embodiment, policy management server 104 alters bandwidth available to a user according to the terms of the action alert if the response to alert 410 indicates acceptance of the offer. In an embodiment, policy management server 104 transmits response 412, 414 to billing server 106 and PNCC server 102, respectively. Response 412, 414 may identify the acceptance or denial of action alert 408. In an embodiment, billing server 106 may update an account balance of a user of UE 108 based on response 412 indicating the acceptance of action alert 408. PNCC server 102 may use response 414 to further refine congestion prediction models. For example, future network traffic may be monitored to determine what effect X % of users accepting the alert had on predicted congestion levels.

Figure 5:
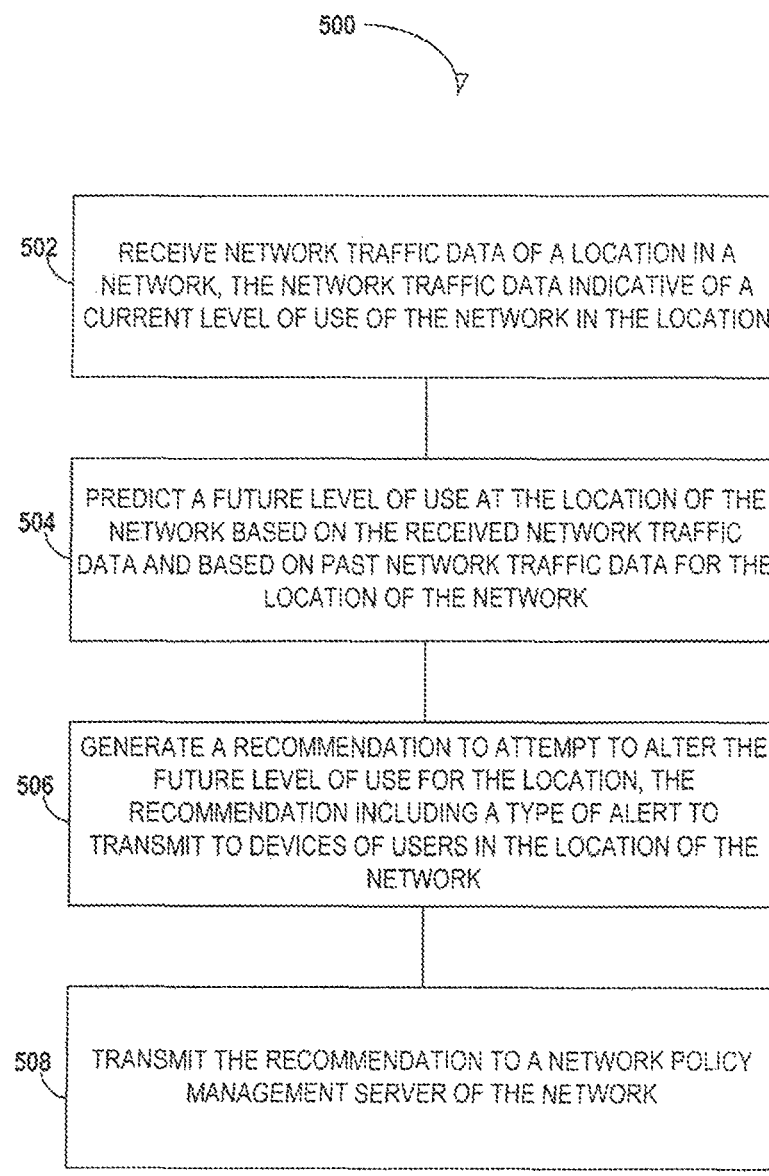
FIG. 5 is a flow chart illustrating a method to generate a recommendation, according to an example embodiment

FIG. 5 is a flow chart illustrating a method 500 to generate a recommendation, according to an example embodiment.

At block 502, in an embodiment, network traffic data of a location in a network is received. The network traffic data may be indicative of a current level of use of the network in the location. In an embodiment, the network traffic data is received at a server such as PNCC server 102.

At block 504, in an embodiment, a future level of use at the location of the network is predicted based on the received network traffic data and based on past network traffic data for the location using any of the methods described herein. The future level of use may be predicted using a data analysis engine of PNCC server 102. In an embodiment, the predicted future level of use may indicate that congestion will occur above acceptable limits.

At block 506, a recommendation to alter the future level of use for the location is generated using any of the methods described herein. "Altering" may include reducing a predicted level of congestion in the location. In an embodiment, the recommendation includes a type of alert to transmit to devices of users in the location of the network. Determining the recommendation may include modeling the future level of use based on a subset of the users in the location in the network responding to the type of alert. For example, it may be determined that 10 people responding to an alert reduces congestion by 1%. Modeling may include analyzing past response rates of users in the location of the network to the type of alert. The recommendation may be generated on a server such as PNCC server 102.

In an example, the type of alert may be an offer to change the QoS of the network for a device of a user on the network. The change in the QoS may include changing the bandwidth (e.g., bitrate) available to the device. In an embodiment, the type of alert includes a duration of the change in the QoS. In an embodiment, the type of alert includes changing the QoS for a type of data received at the device.

At block 508, in an embodiment, the recommendation is transmitted to a network policy management server of the network.

Figure 6:
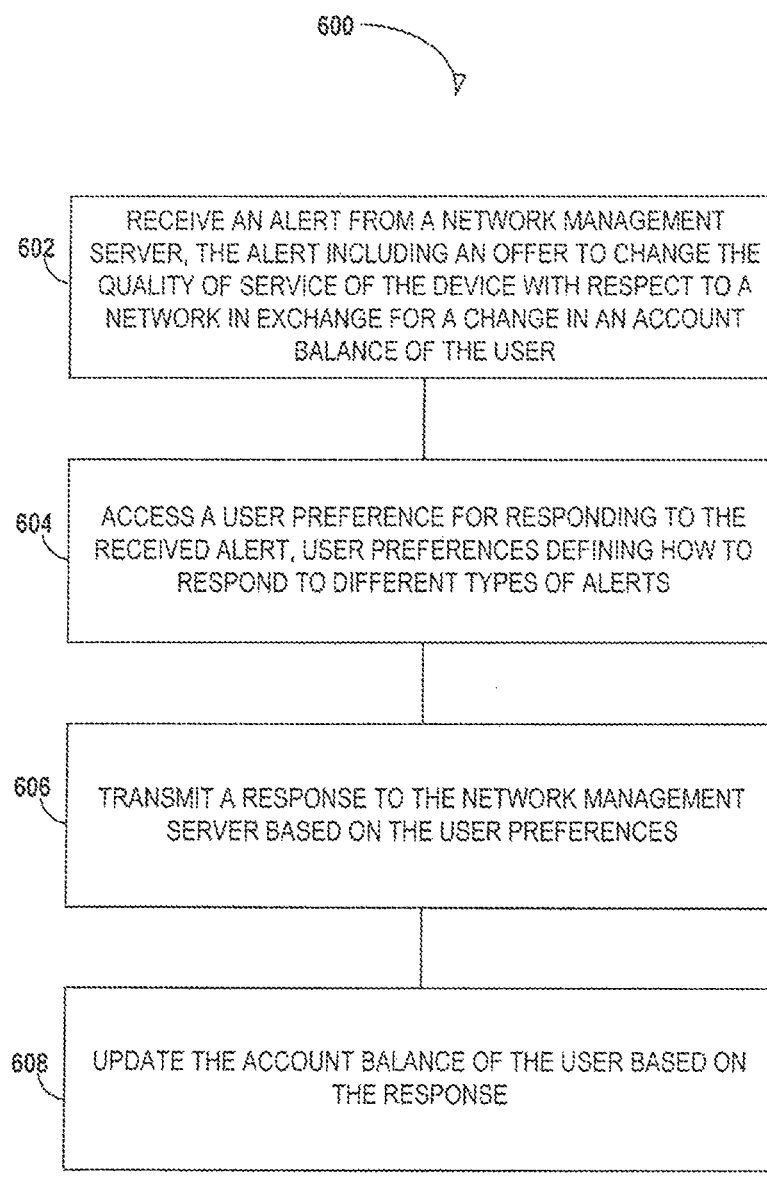
FIG. 6 is a flow chart illustrating a method to respond to an alert, according to an example embodiment

FIG. 6 is a flow chart illustrating a method 600 to respond to an alert, according to an example embodiment.

At block 602, in an embodiment, an alert is received at a device from a network management server. In an embodiment, the alert includes an offer to change the quality of service of the device with respect to a network in exchange for a change in an account balance of the user. For example, the alert may include an alert offering a decrease in quality of service for the device in exchange for an increase in the account balance or the alert may offer an increase in quality of service for video received at the device in exchange for a decrease in the account balance of the user.

At block 604, in an embodiment, a user preference for responding to the received alert is accessed. For example, accessing may include retrieving a rule stored on the device that identifies when to display the alert to the user. The user preference may also define how to respond to different types of alerts. For example, a user preference may identify when to automatically accept an offer.

At block 606, in an embodiment, a response is transmitted to the network management server based on the user preferences.

At block 608, in an embodiment, the account balance of the user may be updated based on the response. For example, the device may store an account balance of the user and decrement or increment the balance based on the acceptance of the offer. In an embodiment, the device transmits a balance adjustment request to a billing server. The balance adjustment request may include the offer amount and an identification of the account of the user.

Modules, Components and Logic

Certain embodiments are described herein as including logic or a number of modules, components, engines or mechanisms (collectively referred to as module. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs.)

Example Machine Architecture, and Machine-Readable Medium

Figure 7:
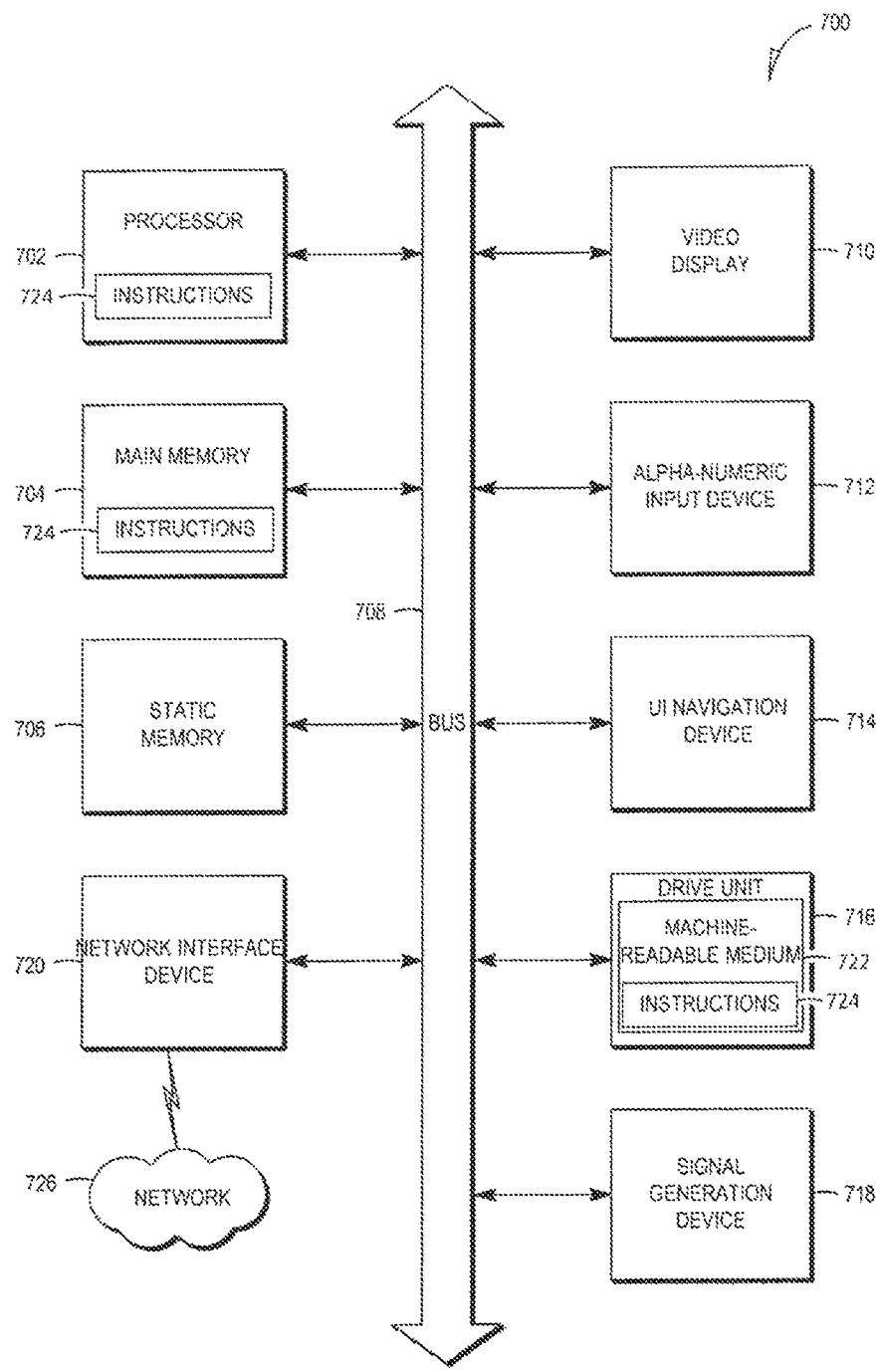
FIG. 7 is a block diagram of machine in the example form of a computer system within which a set instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer or distributed) network environment. The machine may be a PC, a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (CPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a disk, drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    a network interface configured to receive network traffic data of a location in a network, the network traffic data being indicative of a current level of use of the network at the location;
    a data analysis engine configured to:
        predict a future level of use at the location of the network based on the received network traffic data and based on past network traffic data for the location of the network; and
        model the future level of use based on a subset of user devices of the network at the location responding to a type of alert in the past;
    a recommendation engine configured to: generate a recommendation to alter the future level of use for the location and transmit the recommendation to a network policy management server of the network;
    the network policy management server configured to:
        determine a number of user devices at the location to receive the alert based on: the recommended alteration of the future level of use at the location, an amount of the future level of use altered by each user device that accepts an offer associated with the alert, and the past acceptance rate of user devices to the offers; and
        transmit a type of alert to the determined number of user devices at the location, the alert including an offer to alter the user's level of network usage.

2. The system of claim 1, wherein the type of alert is an offer to reduce a quality of service of the network for a device of a user on the network.

3. The system of claim 2, wherein the reduction in the quality of service includes changing a bitrate available to the device.

4. The system of claim 2, wherein the type of alert includes a duration of the reduction in the quality of service.

5. The system of claim 2, wherein the type of alert includes reducing the quality of service for a type of data received at the device.

6. The system of claim 1, wherein the model of the future level of use is dynamically adjusted as new network traffic data becomes available.

7. A method comprising:
    receiving network traffic data of location in a network, the network traffic data being indicative of a current level of use of the network at the location;
    identifying a predicted future level of use at the location of the network based on the received network traffic data and based on past network traffic data for the location of the network;
    modeling the future level of use based on a subset of the user devices of the network at the location responding to a type of alert in the past;
    generating a recommendation to alter the future level of use for the location;
    transmitting the recommendation to a network policy management server of the network; and
    transmitting a type of alert to devices of users of the network at the location, the alert including an offer to alter the user's level of network usage, wherein a number of user devices at the location to receive the alert is determined based on: the recommended alteration of the future level of use at the location, an amount of the future level of use altered by each user device that accepts the offer, and the past acceptance rate of user devices to the offers.

8. The method of claim 7, wherein the alert includes an offer for a decrease in quality of service for a device in exchange for an increase in an account balance of the user.

9. The method of claim 8, wherein the account balance of the user is updated based on a response to the alert by increasing a monetary account balance of the user when the response includes an acceptance of the offer.

10. The method of claim 8, wherein the account balance of the user is updated based on a response to the alert by increasing a loyalty point account balance of the user when the response includes an acceptance of the offer.

11. The method of claim 8, wherein the decrease in the quality of service includes changing a bitrate available to a device.

12. The method of claim 8, wherein the type of alert includes a duration of the decrease in the quality of service.

13. The method of claim 8, wherein the type of alert includes decreasing the quality of service for a type of data received at the device.

14. The method of claim 7, wherein user preferences identify when to display an alert to a user.

15. The method of claim 7, wherein user preferences identify when to automatically accept an offer.

16. The method of claim 7, wherein the alert includes an offer for an increase in quality of service for video received at the device in exchange for a decrease in the account balance of the user.

17. A computer-readable storage device comprising instructions, which when executed by at least one processor, configure the at least one processor to perform operations comprising:

receiving network traffic data of location in a network, the network traffic data being indicative of a current level of use of the network at the location;

identifying a predicted future level of use at the location of the network based on the received network traffic data and based on past network traffic data for the location of the network;

modeling the future level of use based on a subset of the user devices of the network at the location responding to the type of alert in the past;

generating a recommendation to alter the future level of use for the location;

transmitting the recommendation to a network policy management server of the network; and transmitting a type of alert to devices of users of the network at the location, the alert including the offer to alter the user's level of network usage, wherein a number of user devices at the location to receive the alert is determined based on: the recommended alteration of the future level of use at the location, an amount of the future level of use altered by each user device that accepts the offer, and the past acceptance rate of user devices to the offers.

18. The computer-readable storage device of claim 17, wherein the type of alert is an offer to reduce a quality of service of the network for a device of a user on the network.

19. The computer-readable storage device of claim 18, wherein the reduction in the quality of service includes changing a bitrate available to the device.

20. The computer-readable storage device of claim 18, wherein the type of alert includes a duration of the reduction in the quality of service.

* * * * *